Figure 1:
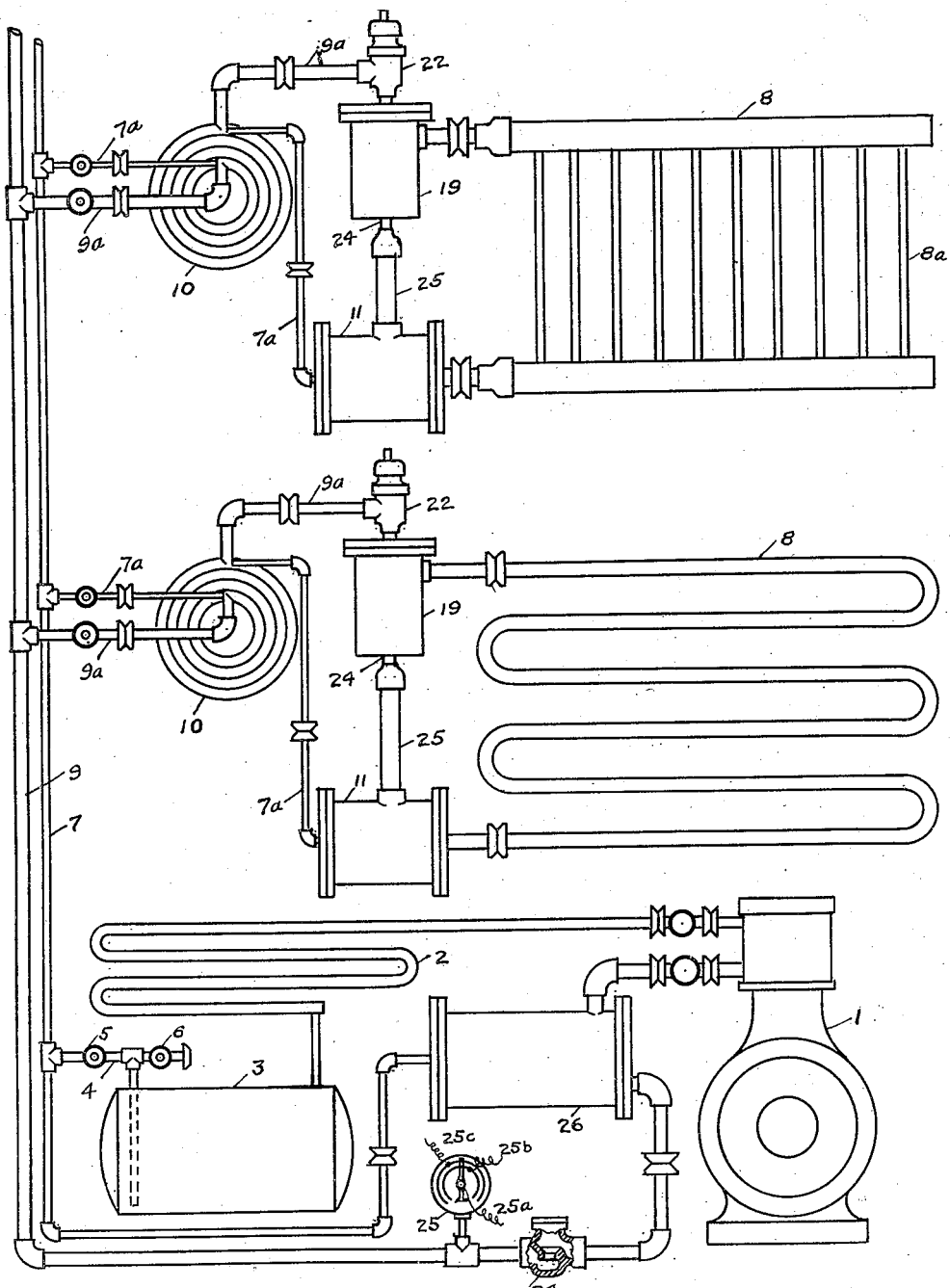

Dec. 26, 1933.  B. C. SHIPMAN  1,940,734
REFRIGERATING SYSTEM
Filed June 15, 1929   2 Sheets-Sheet 2
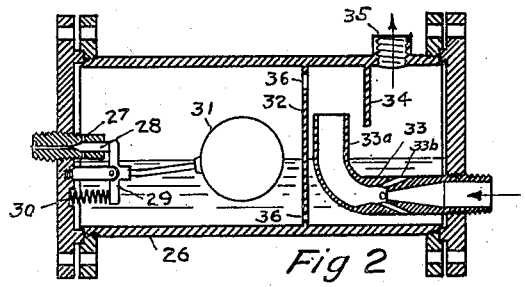
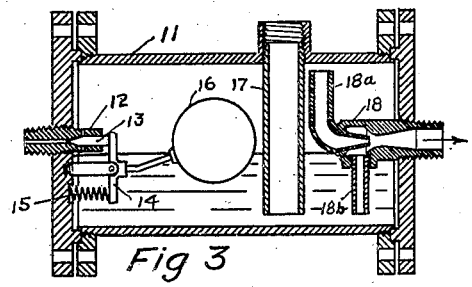
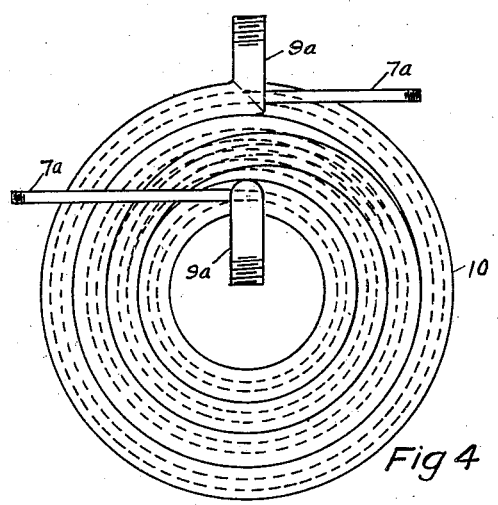
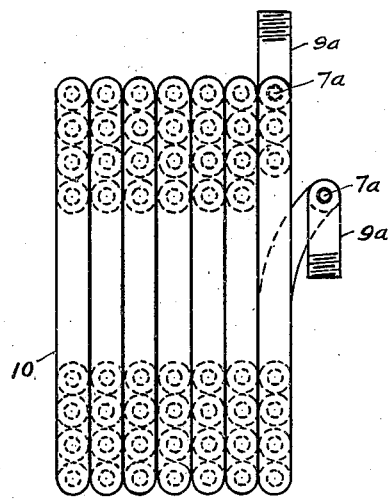
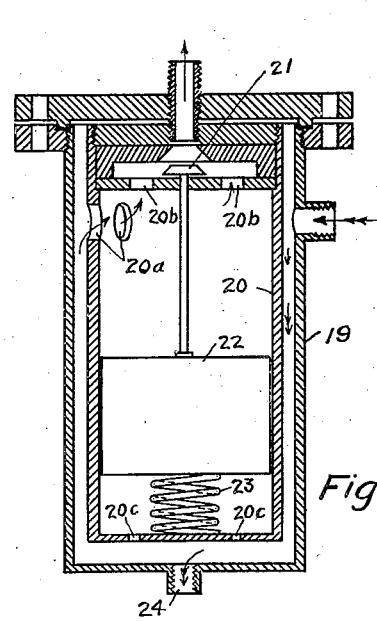
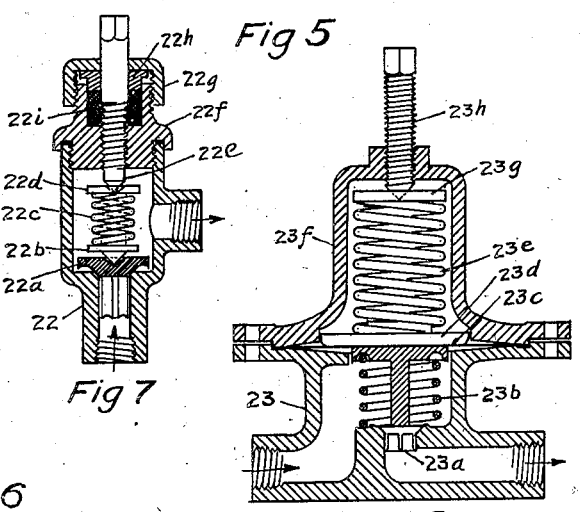
Inventor
Bennet Carroll Shipman.

Patented Dec. 26, 1933

1,940,734

UNITED STATES PATENT OFFICE 1,940,734

REFRIGERATING SYSTEM

Bennet Carroll Shipman, San Mateo, Calif.

Application June 15, 1929. Serial No. 371,149

11 Claims. (Cl. 62—126)

This invention relates particularly to systems of refrigeration for eliminating heat losses in return lines, as set forth in my application Serial No. 207,745, filed July 22, 1927. It has for its objects reduction in the amount of refrigerant necessary to charge a given evaporating system, the automatic control of temperature at various values in various evaporators in various locations, the ensuring of retention of all liquid refrigerant in the said various evaporators, the complete utilization of all the surface of such evaporators for effective refrigeration, the elimination of losses now inherent in present methods of accomplishing some of the above objects, and other objects as will appear herein.

The present invention consists in method and apparatus for realizing the above objectives. It consists in a novel arrangement and combination of the parts of a refrigerating system, whereby a self contained circulation of the liquid refrigerant is maintained in each of the evaporators independently, with provision for keeping such refrigerant as liquid in said evaporators and preventing it from reaching the suction line, while at the same time supplying all of the surface of said evaporators with liquid refrigerant; also whereby the temperature of any evaporator may be adjusted as desired by predetermining the pressure at which such evaporator operates, regardless of the suction pressure of the system as a whole or of the pressure of any other evaporator, and at the same time economizing on the amount of liquid evaporated required to cool itself on admission to any evaporator proportional to the temperature of such evaporator; also whereby substantially all of the heat losses, as well as all sweating and frosting of suction lines are eliminated, and whereby the operation of the refrigerating plant is effected by any evaporator, independently of all others; all of which is set forth in the accompanying drawings and this specification.

Fig. 1 represents a refrigerating system, showing a compressor which may equally well be a generator and absorber, embodying my invention; Fig. 2 represents a float controlled admission valve and saturating or cooling chamber; Fig. 3 represents a float controlled admission valve and atomizing chamber; Fig. 4 illustrates a simple form of heat exchanger in end elevation; Fig. 5 illustrates the same in side elevation; Fig. 6 shows a preferred form of separator with emergency float valve; Fig. 7 illustrates a common form of a spring controlled relief valve; and Fig. 8 similarly of a diaphragm pressure controlled relief valve.

Describing the figures and the operation in detail: a compressor 1, removes refrigerant gas from the suction line 9, and compresses, and condenser 2, liquefies the same, which flows as usual by gravity into receiver 3, whence it passes by liquid line 4, through stop valve 5, to distributing line 7, supplying as many evaporators in multiple as may be required. A charging valve 6, and connections provide means for charging the system with refrigerant. Each evaporator 8 is supplied by a branch line 7a, tapped from supply line 7, which line 7a, passes in close heat exchange relationship with the return branch lines 9a, shown as one pipe within another wound up as a helix 10, as illustrated in Figs. 4 and 5. After passing helix 10, the line 7a, feeds a float valve 12, within a vessel or tank 11, shown in vertical cross section in Fig. 3. One form of float valve is illustrated, wherein the valve pin 13, is held to its seat by the ball float 16, through the action of the lever 14, assisted by the spring 15, to compensate in part for the weight of the float. An increase or decrease of the liquid from a predetermined level causes the valve, 12, to close or open as the case may be. Projecting into this vessel 11, is a drain connection 17, terminating well below the normal level of the liquid therein. Also leading out of the vessel 11, is an atomizing nozzle comprising essentially a part 18a, projecting into the gas space above the liquid, and a part 18b, projecting down into the liquid space. The atomizing nozzle is shown in the form of a Venturi tube aspirator, whereby a flow of gas through the part 18a, will aspirate liquid through the throat from the liquid pipe 18b, and pass the mixture of gas and liquid out of the exit into the evaporator 8. A continuation of this action eventually scatters the mixture throughout the internal space of the evaporator 8, some liquid evaporating of course and forming more gas and being replenished from the vessel 11, by the action of the float valve already described. The gas to cause the aspirator action in nozzle 18, is necessarily furnished by the gas formed by the evaporation of the liquid as admitted in cooling itself from the temperature of admission to the temperature of evaporation.

When the whole of the evaporator has thus been supplied with a more or less dense layer of liquid on its internal surface, the action continuing, and excess finally reaches the outlet of the evaporator and spills over into the separator 19.

This separator is shown as a circular shell 19, in which is a second concentric circular shell 20, acting as a baffle, which has openings 20a, on the side opposite to which the refrigerant is admitted from the evaporator 8. Thus the entering gas must impinge on the shell 20, and pass around it by a circuitous route, so losing any entrained liquid on the surface of the shell 20, thence through the holes 20a and 20b, through the valve 21, and so eventually to the branch suction line 9a. The valve 21, is normally down, or open, and is attached by a rod to a float 22, below, counterbalanced to certain extent by the spring 23, to partially compensate for its weight. The purpose of this float valve 21, is to shut off the outlet of the separator 19, to the branch suction line 9a, in case, through some possible defective operation of the float admission valve 12, due to dirt or other causes, the liquid should ever rise high enough in the separator 19, to lift the float 22, thus positively preventing any liquid from reaching the outlet line. Therefore in the shell 20, the holes 20c, are provided for the admission of such emergency liquid to the float, as well as to drain any liquid therefrom that might accumulate from normal operation within the shell 20. In case any abnormal conditions have allowed so much liquid to accumulate as to operate the float controlled outlet valve 21, on any evaporator, this evaporator will be definitely cut out of circuit and will so remain until the trouble has been rectified but will in no way interfere with the correct operation of the balance of the system.

As pointed out above, the excess liquid over and above the evaporating capacity of an evaporator finally enters the separator 19. The liquid separated from the gas by the baffle shell 20, drains down and passes out the outlet 24, being thence conducted by the conduit 25, and connection 17, back into the vessel 11, under the surface of the liquid therein. Thus a mixture of gas and liquid is maintained in rapid circulation throughout the evaporator 8, while only liquid returns from the separator 19, to the vessel 11, all evaporated liquid being made up as needed by the float valve 12. It is important to note that the liquid will rise higher through the evaporator itself than through the connections 24, 25, and 17, and as much higher as may be required if the proper design is used. As indicated in the drawings, the elements or pipes of the evaporators 8 or 8a, are smaller in cross section than the return drains 25. The heat absorbing surface of such elements evaporate more liquid and evolve more gas per unit volume of liquid in small section than in larger ones, due to the fact that surface areas are proportional directly to diameters while the contents are proportional to the squares of the diameters. Also the lifting effect of a given amount of gas mixed with a liquid becomes less the larger the containing pipe becomes. In the design specified above advantage is taken of both of these effects. Therefore the mixtures of liquid and gas rises higher in the smaller tubes than in the larger ones as the specific gravity of such mixture is necessarily less in the former case than in the latter. Also in addition to the gas formed by the evaporation in the elements of the evaporator itself, additional gas is also admitted to the evaporator,—that due to the evaporation of the liquid on admission to vessel 11, necessary to cool itself. All of this gas is admitted to the evaporator only and not to the drain connection 25, and 17, which terminates under the surface of the liquid in vessel 11, and therefore cannot receive any such gas.

The amount of liquid circulating as above described is preferably regulated to an amount somewhat more than sufficient to properly supply the whole of the evaporator so as to make all of it effective, thus keeping the amount to be drained back to the vessel 11, to a minimum. Such regulation can be effected by adjustment of the atomizing nozzle, and to some extent by the level of the liquid maintained in the vessel 11. As this method of distributing the liquid throughout the evaporator results in the maintaining the interior surface of the evaporator wetted instead of flooded solid, it effects a large reduction in the amount of refrigerating fluid necessary to charge,—an important item in a large system involving many thousand feet of pipe. It is to be noted, also, that this method gives a rapid movement of the liquid through the evaporator and therefore a greater heat transference than if the liquid were more stationary as in a flooded system, thus reducing the amount of evaporator surface necessary for a given duty at a given difference of temperature.

The gas, after passing valve 21, in Fig. 1, passes through a pressure reducing valve 22, illustrated as an ordinary spring controlled relief valve in Fig. 7, or as a diaphragm valve in Fig. 8. In Fig. 7, in vertical section, the valve 22a is held to its seat by the tension of the spring 22c bearing upon the centering point 22b, and the spring is adjusted in tension by the screw 22e, bearing through the centering button 22d, upon the said spring. A packing nut 22g, operating on a follower 22h, compresses the packing 22i, to seal the stem of the screw 22e, the whole assembly being carried in a head 22f, screwed into the body of the valve 22, with a gasket. The valve 22a, is preferably made, as shown, with a reverse curve above the valve slope to prevent chattering, as the escaping gas acting over a larger area with the valve slightly open than when closed, provides a definite but close difference in pressure between opening and closing. It is evident that when the pressure against the underside of the valve 22a, exceeds that above said valve by an amount more than the tension of the spring 22c, the valve will open sufficient to maintain this difference and put the evaporator to which it is connected at the bottom into communication with the suction line 9a, to which it is connected at its outlet. Thus the pressure, and therefore the temperature, at which any particular evaporator operates in relation to the suction pressure of the system can be set at any point desired, regardless of the pressures in the balance of the evaporators. When any evaporator has reached a temperature, and therefore a pressure, below that necessary to hold the valve 22a, off its seat, the valve will close and that evaporator be cut off from the system until such time as its temperature and therefore pressure rises again sufficiently to repeat the cycle already described.

Similarly also with the diaphragm valve shown in vertical section in Fig. 8, the valve 23a rests on a seat in the body 23, and is lifted off its seat, when allowed, by the spring 23b, cooperating with its head, on which the diaphragm 23c, bears by the tension of the spring 23e, resting on the button 23d. A tension screw 23h, operating in the housing 23f, and bearing on the centering button 23g, serves to determine at what pressure on the under side of the diaphragm the valve 23a, will rise from its seat, and thus put the evaporator into connection with the branch suction line 9a, the cycle of operation being substantially the same as in the case already described.

The gas after passing through the pressure reducing valve then passes into the heat exchanger 10, as already referred to. As shown, this heat exchanger consists merely of two tubes of the proper length and size to secure the correct area for the gas to be handled and the necessary surface for the heat to be exchanged, one inside the other and wound up into a helix. It can be made in many other forms. The gas in one tube and the liquid in the other should be counter flow to secure the maximum average difference in temperature throughout the exchanger. Thus the cold gas passing out from the evaporator absorbs the heat of the incoming liquid, and is thus heated substantially to the temperature of the incoming liquid, usually atmospheric temperature, while the liquid is sub-cooled to some point between its initial temperature and that of the evaporator, which point depends both on its initial temperature and the temperature of the evaporator.

This arrangement effects a material saving not only by the heat transfer between incoming and outgoing refrigerant in general, as set forth in my application Serial No. 207,745, but also and especially in the case of various different temperatures in various evaporators by utilizing the sub-cooling of the effluent gas caused by the reduction in pressure at the pressure reducing valves on the outlets of evaporators. A pressure reducing valve alone without a heat exchanger, as has been proposed and used on the outlets of evaporators to secure various evaporating pressures, is an actual source of loss and a possible nuisance from frost and sweat, as a concrete example will readily show. Let a common case be assumed: a plant in which the lowest temperature required is −10° F. for a sharp freezer, and +40° F. for a cooler. The suction pressure to be carried will necessarily have to be low enough for the lowest temperature,—at least −20° F. if a conservative temperature difference of 10° be assumed between the air of the freezer and the evaporator therein. If the little more liberal temperature difference of 15° be assumed for the cooler, the corresponding pressures in the two evaporators will be 3.6 lbs. per square inch and 39 lbs. per square inch respectively for the freezer and the cooler, using ammonia as the refrigerant. However saturated ammonia vapor at 39 lbs. pressure per square inch and at 25° F., its corresponding temperature, will sub-cool to 5.5° F. on being reduced in pressure to 3.6 lbs. per square inch. In other words it will now be approximately 20° colder than before it passed the pressure reducing valve, and if it then passes immediately into the suction line, no useful refrigeration can be secured from it and it becomes merely a source of loss and an annoyance due to frost or sweat on the suction line.

On the contrary, by my invention the additional cooling of the effluent gas is completely utilized in further sub-cooling the entering liquid refrigerant, and therefore saves the loss now inherent in attempting to utilize desirable higher evaporator pressures with lower suction pressures. This is a material point in increasing the efficiency where different temperatures are required in different evaporators and is quite a distinct and different matter from heat exchangers alone in conjunction with evaporators, and represents a material improvement in the art.

After passing the heat exchanger helices 10, the superheated gas passes into the general suction line 9, from any of the evaporators, and, being substantially at atmospheric temperature, cannot absorb any further heat even if uninsulated. Before reaching the compressor, or absorber, a check valve 24, inserted in the line 9, prevents any return flow that might arise from the saturator 26, or leaking valves or crank case of the compressor. The saturator 26, is for the purpose of cooling the incoming superheated gas to the temperature corresponding to its pressure. As shown in Fig. 2, this saturator consists of a containing shell with heads 26, a float controlled valve 27, wherein the valve pin 28, is held to its seat by the ball float 31, through the action of the lever 29, assisted by the spring 30, to compensate in part for the weight of the float. A wall or baffle 32, across the shell, perforated at top and bottom by holes 36, serves to prevent violent fluctuations of liquid level from being transferred from one compartment to the other, and to make a fairly uniform level for operating the float. The nozzle 33, shown as a form of Venturi tube inspirator is fed by the returning gas and draws liquid into it through the ports 33b, intimately mingling the same with the incoming gas, and therefore immediately cooling and saturating the same. The mixture is ejected through the upright tube 33a, any excess liquid dropping back into the compartment, and the gas passes around the baffle 34, to assist separation of the liquid, and thence out the outlet 35, to the suction of the compressor. The float valve 27, is connected to the main liquid line 7, being supplied from the receiver, as in the case of the evaporators. The saturator 26, being of course at the temperature of the low pressure liquid, should be insulated, but being small requires very little in amount.

It is often very desirable to operate such a plant automatically, especially where many different temperatures are to be maintained. A pressure sensitive device, such as a Bourdon tube 25, is installed in the main suction line between the evaporators and the above mentioned check valve 24. This pressure sensitive device should have the requisite contacts to operate control circuits governing the motive power of the compressor, such devices being in every day use by all familiar with the art, and therefore not specifically shown herein. Three wires are shown connecting to this device, one 25a, to the movable arm responsive to the pressure, and the other two to contacts movable about concentric arcs, one, 25b, for contacting the said arm as it moves clockwise, and the other, 25c, as it moves counter clockwise, making respectively one contact for a predetermined upper pressure to start the apparatus, and the other contact for a predetermined lower pressure to stop the apparatus. Other and different pressure sensitive devices could equally be used.

While the function of the check valve 24, is important in keeping the suction line free of pressures other than those determined by the evaporators themselves, in automatic operation it becomes even more important, as the following considerations will show. Let it be assumed that the plant has been in operation for sufficient time and has successively reduced each of the several evaporators to their desired pressures and temperatures, and that each such evaporator successively has been shut off by its own pressure reducing outlet valve. Evidently then the compressor will be working only on the suction line and very quickly will reduce its pressure to any desired point below the normal operating point so as to operate the pressure sensitive device to cut off the motive power. The check valve 24, thereafter prevents any rise in pressure in the suction line occurring from the saturator 26, or from the compressor, and therefore the plant will remain out of operation until one or another of the evaporators rises in temperature, and therefore pressure, sufficiently to open its respective pressure controlled outlet valve, whereupon the suction line will again be supplied with pressure to operate the pressure sensitive device in the reverse way, so starting up the plant again. It should be noted that this pressure sensitive device is responsive to any evaporator on the system, and that one evaporator cannot interfere with another, condensing refrigerant therefrom or destroying the proper cyclical operation of the plant as a whole. Furthermore any one evaporator requiring more refrigeration than the others is able to secure it without interference with the others, a very important matter in such installations as abattoirs between the chill room and the coolers, or in restaurants between the service boxes and the storage rooms.

It is evident that the particular devices shown in the application of my invention can be made in many other forms and substitutes and therefore my invention is not limited to these particular devices but includes any by which my method may be applied.

I claim:

1. That improvement in the art of refrigeration applied to a plurality of evaporators at different temperatures which consists first in separating gas from liquid, if any, in the fluid issuing from said evaporators and then reducing the pressure of such gas from the various evaporators correspondingly to the temperatures desired therein, and thereafter transferring the negative heat of the said gas of each evaporator to the refrigerant liquid incoming to the same evaporator.

2. That improvement in the art of refrigeration which consists in separating effluent mixed fluid of an evaporator into gas and liquid, passing the said gas to exhaust and said liquid back to said evaporator by gravity, and interrupting the exhaust when the liquid exceeds a predetermined level.

3. Improvement in the art of refrigeration which consists in separating effluent mixed fluid of an evaporator into gas and liquid, passing the said gas to exhaust and the said liquid back to the said evaporator, thereafter heating said effluent gas by heat extracted from the refrigerant liquid incoming to said evaporator before admission thereto, and interrupting the exhaust when the liquid exceeds a predetermined amount.

4. Improvement in the art of refrigeration which consists in separating effluent mixed fluid of an evaporator into gas and liquid, passing said gas to exhaust and the said liquid back to the said evaporator, thereafter heating said effluent gas by heat extracted from the refrigerant liquid incoming to said evaporator before admission thereto, interrupting the exhaust when the liquid exceeds a predetermined amount, and recooling said gas before re-compression.

5. Improvement in the art of refrigeration which consists in separating effluent mixed fluid of an evaporator into gas and liquid, passing said gas to exhaust and said liquid back to said evaporator, then reducing the pressure of said effluent gas at the exhaust, thereafter heating said effluent gas by heat extracted from the refrigerant liquid incoming to said evaporator before admission thereto, interrupting the exhaust when the liquid exceeds a predetermined amount, and recooling said gas before re-compression.

6. Improvement in the art of refrigeration which consists in successively controlling the amount of refrigerant liquid admitted to evaporators by the level of the liquid therein respectively, separating liquid, if any, from gas in the effluent fluid from said evaporators, passing such separated liquid back to the inlet of and said gas to the exhaust of said evaporators, interrupting the exhaust of any evaporator when the liquid admitted exceeds a predetermined amount, reducing the pressure of the effluent gas after aforesaid separation by predetermined amounts, heating the effluent gas from each evaporator after pressure reduction by heat extracted from liquid refrigerant incoming to the same evaporator before admission to same, and recooling all said gas before re-compression.

7. In combination with an evaporator of a refrigerating system, a liquid admission valve thereto, a separator between the outlet of the evaporator and the suction line, connected re-entrantly to said evaporator, and vented to the suction line, and a float operated valve adapted to close said vent if and when the liquid refrigerant admitted to said evaporator exceeds a predetermined amount.

8. In combination with an evaporator of a refrigerating system, a separator having an inlet connected to the outlet of said evaporator, a drain connected re-entrantly to said evaporator and an outlet connected to the exhaust line, a float controlled valve adapted to close said outlet to the exhaust line if and when the liquid refrigerant in said separator exceeds a predetermined level, and a heat exchanger comprising a portion of the exhaust path from the separator and a portion of the liquid refrigerant supply path to the said evaporator.

9. In combination with a refrigerating system, an evaporator, a separator having an inlet connected to the outlet of the said evaporator, a drain connected re-entrantly to the said evaporator and an outlet connected to the exhaust line, a float controlled valve adapted to close said outlet to the exhaust line if and when the liquid refrigerant in said separator exceeds a predetermined level, an adjustable pressure reducing valve in said exhaust line, and a heat exchanger thereafter comprising a portion of the exhaust path from said separator and a portion of the liquid refrigerant supply path to the said evaporator.

10. In combination in a refrigerating system, a compressing means, condensing means, refrigerant liquid supply and gas exhaust lines, a plurality of evaporators, a separator for each evaporator having an inlet connected to the outlet of said evaporator, a drain connected re-entrantly to said evaporator and an outlet connected to the exhaust line, a float controlled valve adjacent to each evaporator adapted to close said outlet to exhaust line from the separator of any evaporator if and when the liquid refrigerant in that evaporator exceeds a predetermined amount, an adjustable pressure reducing valve in the exhaust line from any separator, a heat exchanger connected in close heat exchange relation between the exhaust line from each separator and the liquid refrigerant supply line to the corresponding evaporator, and a refrigerant gas saturator connected in the common exhaust line from all separators adjacent to the compressing means.

11. In combination in a refrigerating system, a compressing means, a condensing means, refrigerant liquid supply and gas exhaust lines, a plurality of evaporators, a separator for each evaporator having an inlet connected to the outlet of said evaporator, a drain connected reentrantly to said evaporator and an outlet connected to the exhaust line, a float controlled valve adjacent to each evaporator adapted to close said outlet to exhaust line from the separator of any evaporator if and when the liquid refrigerant in that evaporator exceeds a predetermined amount, an adjustable pressure reducing valve in the exhaust line from any separator, a heat exchanger connected in close heat exchange relation between the exhaust line from each separator and the refrigerant liquid supply line to each evaporator, a refrigerant gas saturator connected in the common exhaust line from all separators adjacent to the compressing means, and a check valve in said common exhaust line between the said saturator and the said separators.

BENNET CARROLL SHIPMAN.